Dec. 28, 1965  J. B. NEWMAN, JR  3,225,386
EXTRUSION APPARATUS
Filed Sept. 12, 1963  2 Sheets-Sheet 1
FIG. 1
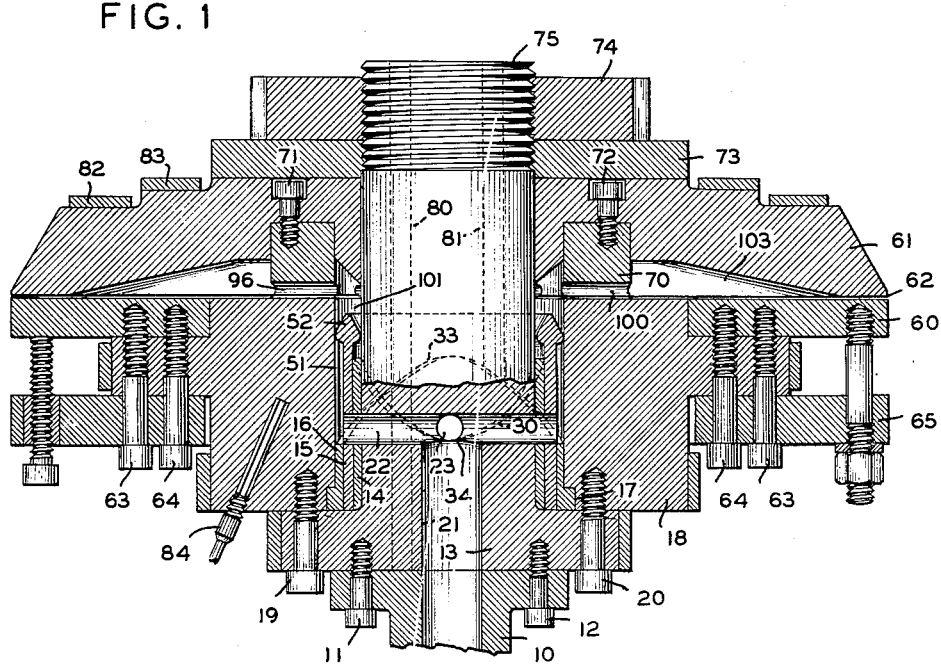
FIG. 3
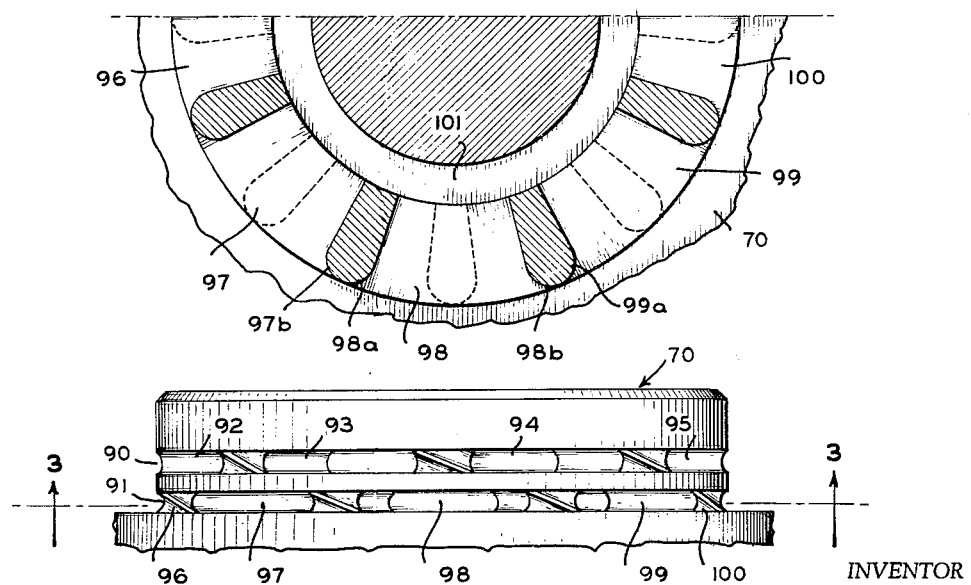
FIG. 4
INVENTOR
JAMES B. NEWMAN, JR.
BY E. Janet Berry
ATTORNEY Dec. 28, 1965   J. B. NEWMAN, JR   3,225,386
EXTRUSION APPARATUS
Filed Sept. 12, 1963                    2 Sheets-Sheet 2

INVENTOR
JAMES B. NEWMAN, JR.
BY
ATTORNEY

United States Patent Office 3,225,386
Patented Dec. 28, 1965

1

3,225,386
EXTRUSION APPARATUS
James B. Newman, Jr., Shortsville, N.Y., assignor to National Distillers and Chemical Corporation, New York, N.Y., a corporation of Virginia
Filed Sept. 12, 1963, Ser. No. 308,578
8 Claims. (Cl. 18—14)

The present invention relates to die structure for the extrusion of thin films of thermoplastic materials. More particularly it relates to a die structure in which the die provides intermingling of two flow streams of the plastic material within the internal die passageways in such fashion as to avoid formation of seam-like markings in the material as extruded from the die orifice. Specifically, the invention relates to such a structure which includes means to produce flow of two axially directed streams in such fashion as to be in substantially overlapped relation, over a relatively wide area, thus to eliminate the formation of discrete seam or weld lines in the material as discharged from the die orifice.

In the prior art, many complex structures have been devised to accomplish the objects of the present invention. Most of these have required precise machining and matching of parts disposed internally of the die body. It is a principal object of the present invention to provide a simple mechanical assembly of parts whereby a relatively smooth extruded film of thermoplastic material may be produced.

In accordance with the invention, the die is provided with a center post which has two outlet channels which are perpendicular to one another. The center post channel outlets are enclosed by two concentric hollow cylinders which each have opposing tapered-cuts which taper outwardly at the end of the rings where the bottom of the taper of one ring is rotated by 90° with respect to the bottom of the taper of the other ring.

The bottom portions of the taper of the first ring are then disposed below the opposite ends of a first channel in the center post, while the bottoms of the taper of the second ring are similarly disposed below the ends of the second channel in the center post.

A choke valve may then be interposed between the two concentric rings described above, whereby, as the molten resin moves out of the two perpendicular channels in the center post and upwardly over the center post, the stream will emerge as four streams which overlap one another. Because of this overlap which is obtained from equipment relatively easy to manufacture, weld lines which are formed when two streams of fluid join will be eliminated since the overlap between the four streams is over a large area.

Accordingly, a primary object of this invention is to provide a novel extruding die construction which eliminates weld lines, and is easy to manufacture.

Another object of this invention is to provide a novel die structure for delivering an axially moving continuous circular stream of a molten resin which does not have weld lines.

These and other objects of this invention will become apparent from the following description when taken in connection with the drawings, in which:

FIGURE 1 shows a side cross-sectional view of a die constructed in accordance with the present invention.

FIGURE 3 shows a cross-sectional view of the radially slotted ring of FIGURE 1 which produces overlapping radially directed streams of flow.

FIGURE 4 is a front plan view of the ring of FIGURE 3.

2 ter post and tapered-cut rings for introducing an axial flow of molten resin to the radial ring of FIGURE 3.

Figure 2:
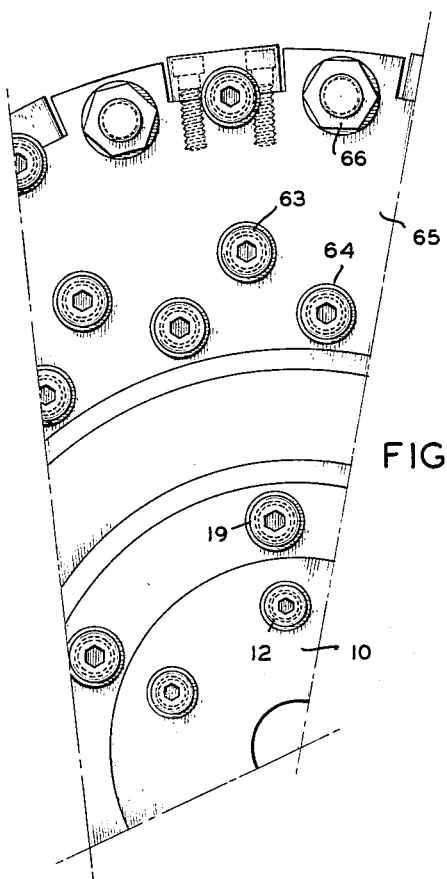
FIGURE 2 shows a fragmentary bottom plan view of the die of FIGURE 1.

Referring first to FIGURE 1, the die assembly is carried on a post 10 which is secured to an appropriate extruder. Post 10 has openings therein that receive bolts such as bolts 11 and 12 (FIGURE 2) which are threadably received by a center post 13. The center post 13 then has a welded assembly of an inner ring 14, a choke ring 15 and an outer ring 16 clamped thereon by means of a shoulder 17 in the die body 18 which is fastened to center post 13 by the bolts such as bolts 19 and 20.

Figure 5:
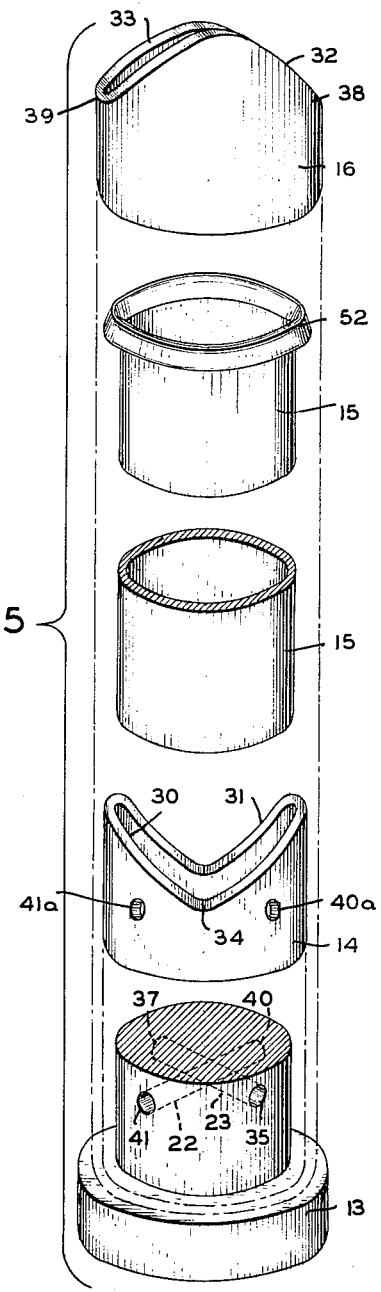
FIGURE 5 is an exploded perspective view of the cen-

Referring to FIGURE 5 which shows the arrangement of center post 13 and rings 14, 15 and 16, it should be first observed from FIGURE 1 that center post 13 has an inner channel 21 which receives a flow of molten resin. The channel 21 then communicates with the channels 22 and 23 intermediate of center post 13, and which are perpendicular to the axis of channel 21.

The outer ring 16 and concentric inner ring 14 are similar in configuration, and, as shown in FIGURE 5, contain opposing tapered-cuts 30 and 31 for ring 14, and tapered-cuts 32 and 33 for ring 16.

The bottom section 34 of tapered-cut 30 is arranged to fall below outlet 35 of channel 23, while the bottom portion 36 of cut 31 falls below outlet end 37 of channel 23. In an identical manner, ring 16 which is concentric with ring 14 has the bottom portions 38 and 39 of cuts 32 and 33 respectively falling immediately below ends 40 and 41 respectively of channel 22. It will be noted that ring 14 has openings 40a and 41a in registry with ends 40 and 41 respectively to permit flow from channel 22 to ring 16. When the channels 22 and 23 are perpendicular with respect to one another, it will, therefore, be apparent that the rings 14 and 16 will be so aligned that the bottom portions of their respective tapered cuts are rotated by 90° with respect to one another.

As illustrated in FIGURE 5, a choke ring 15 is interposed between rings 14 and 16. The center post 13 extends upwardly and is contained internally of the assembly of rings 14, 15 and 16.

The operation of the assembly of rings 14, 15 and 16 will be such that two sheets of molten plastic will flow out of ends 35 and 37 of channel 23, will flare out to follow the periphery of tapered-cut 30 and tapered-cut 31 respectively, while being contained between the outer surface of center post 13 and the inner surface of choke ring 15. In a similar manner, but rotated by 90°, two other sheets of molten plastic will be extruded in a form which is limited by the lips of cuts 32 and 33 and confined in thickness between the inner diameter surface 51 of die body 18 and the outer peripheral surface of choke ring 15.

These two sheets of plastic which necessarily overlap each other by 45° will then flow over the enlarged end portion 52 of choke ring 15 so as to join as a common circular sheet of molten plastic which moves axially with respect to the die where the joining of the various sheets occurs without the formation of weld lines.

While in many applications it is now possible to cause this axially directed tube of molten plastic to move directly upwardly through a ring-shaped orifice to be extruded as a tube, it is often desirable that a relatively large diameter be formed whereby it is necessary to move the molten resin radially of the die toward an enlarged ring-shaped opening.

This enlarged die opening is formed in FIGURE 1 by means of a lower lip ring 60, and an upper lip ring 61 which form an extrusion outlet orifice 62. The lower lip ring 60 is secured to die body 18 by means of bolts such as bolts 63 and 64 which pass through an adjustment support plate 65 and abutting screw means such as bolt 66 which is threadably received in plate 65 and abuts against the lower surface of lower lip ring 60.

The upper lip ring 61 is connected to a slotted ring 70 as by a ring of bolts such as bolts 71 and 72. The slotted ring 70 is illustrated in FIGURE 1 as being an upper integral extension of the die body 18. However, ring 70, could, if desired, be a separately machined ring.

A bolster plate 73 is then placed on top of the upper lip ring 61 and a nut 74 is then threaded on to the threaded end 75 of center post 13.

It will be further noted that FIGURE 1 shows the various auxiliary equipment normally used in such a die where, for example, a first and second air conduit 80 and and 81 extend completely through center post 13 so that the tube being drawn can have air pressure injected therein in the usual fashion. In addition, heater bands such as bands 82 and 83 are placed throughout the die surface so that the die can be heated during operation. The usual thermocouple type pick-ups such as pick-up 84 can also be connected, as illustrated, in the die body 18.

Returning now to the specific arrangement of ring 70 and referring particularly to FIGURES 3 and 4, it will be observed that the ring 70 has a first and second series of slots 90 and 91 (FIGURE 4) which are in respective spaced parallel planes. More specifically, FIGURE 4 illustrated four slots 92, 93, 94 and 95 in plane 90 and similar slots 96, 97, 98, 99 and 100 in plane 91. The slots 92 through 100 communicate between channel 101 (FIGURE 2) which is at the end of choke ring 52 and the chamber 103 leading to the outlet orifice 62.

It will be observed from FIGURE 4 that the channels of the two rings of channels overlap one another. By way of example, channel 93 is caused to overlap channels 97 and 98 in the adjacent lower ring of channels. Accordingly, as material is forced from annular chamber 101 into chamber 103, a plurality of overlapping radially directed streams of molten plastic will emerge into channel 103 to join in the channel without the formation of a weld line since there is no discrete line of joining in the extruded plastic tube.

FIGURES 3 and 4 further illustrate the streamlining and nesting between adjacent channels. For example, the channel 98 has extending sections 98a and 98b which are caused to overlap or nest with extending sections 97b and 99a respectively of adjacent channels 97 and 99 respectively. It has been found that such streamlining causes improved non-weld forming characteristics of the ring.

Although this invention has been described with respect to its preferred embodiments, it should be understood that many variations and modifications will now be obvious to those skilled in the art, and it is preferred, therefore, that the scope of this invention be limited not by the specific disclosure herein, but only by the appended claims.

What is claimed is:

1. In combination a center post having an axially directed opening therein for conducting a mass of molten resin, a first, inner, and second, outer, concentric ring concentric with respect to said center post, and a die body surrounding said first and second rings; said center post having a first and second opening therethrough perpendicular to the axis of said center post and at an angle to one another; said first and second rings each having opposed tapered-cuts therein; the bottoms of said opposed tapered-cuts in said first ring communicating with and being under only the respective ends of said first opening; the bottoms of said opposed tapered-cuts in second ring communicating with and being under only the respective ends of said second opening.

2. The device as set forth in claim 1 wherein said first and second openings are in a common plane.

3. The device as set forth in claim 1 wherein said first and second openings have perpendicular axes.

4. The dvice as set forth in claim 1 wherein the outer ring of said first and second rings has openings therein in registry with the respective ends of said first opening.

5. The combination of a center post having an axial channel therein for conducting a mass of molten resin, a first, inner, ring and a second, outer, ring, each concentric with respect to said center post, and a die body surrounding said first and second rings; second and third channels, perpendicular to the axis of said center post and angularly disposed with respect to each other, and communicating with said axial channel and with said first and second rings, respectively; said first and second rings each having opposed tapered-cuts therein, said rings being oriented with respect to each other such that the bottoms of said opposed tapered-cuts in said first ring communicate with, and are disposed under, only the respective ends of said second channel, and the bottoms of said opposed tapered cuts in said second ring communicate with, and are disposed under, only the respective ends of said third channel.

6. The combination as set forth in claim 5, wherein said second and third channels are in a common plane and are mutually perpendicular.

7. The combination of a center post having an axial channel therein for conducting a mass of molten resin, a first, inner, ring and a second, outer, ring, each concentric with respect to said center post, and a die body surrounding said first and second rings; second and third channels, perpendicular to the axis of said center post and angularly disposed with respect to each other, and communicating with said axial channel and with said first and second rings, respectively; said first and second rings each having opposed tapered-cuts therein, said rings being oriented with respect to each other such that the bottoms of said opposed tapered-cuts in said first ring communicate with, and are disposed under, only the respective ends of said second channel, and the bottoms of said opposed taperedcuts in said second ring communicate with, and are disposed under, only the respective ends of said third channel; a third ring disposed between said first and second rings and communicating separately at respective sides thereof with said second and third channels.

8. The combination as set forth in claim 7, including an extrusion orifice; and a fourth, radial, ring, communicating with said extrusion orifice and with said first and second rings, and having a first and a second series of slots in respectively spaced parallel planes, said first and second series of slots being staggered with respect to each other.

References Cited by the Examiner

UNITED STATES PATENTS

| | | | |
|---|---|---|---|
| 2,952,872 | 9/1960 | Buteux et al. | 18—14 |
| 3,079,636 | 3/1963 | Ayleanian | 18—14 |
| 3,112,526 | 12/1963 | Martin | 18—12 |
| 3,163,691 | 12/1964 | Anderson et al. | 18—12 |

WILLIAM J. STEPHENSON, *Primary Examiner.*

L. S. SQUIRES, *Assistant Examiner.*